United States Patent
John

(10) Patent No.: US 10,556,537 B2
(45) Date of Patent: Feb. 11, 2020

(54) VEHICLE MESSAGING SYSTEM

(71) Applicant: Curtis R. John, Van Nuys, CA (US)

(72) Inventor: Curtis R. John, Van Nuys, CA (US)

(*) Notice: Subject to any disclaimer, the term of this patent is extended or adjusted under 35 U.S.C. 154(b) by 731 days.

(21) Appl. No.: 15/148,755

(22) Filed: May 6, 2016

(65) Prior Publication Data

US 2017/0320431 A1   Nov. 9, 2017

(51) Int. Cl.
B60Q 1/50 (2006.01)

(52) U.S. Cl.
CPC .................... B60Q 1/503 (2013.01)

(58) Field of Classification Search
None
See application file for complete search history.

(56) References Cited

U.S. PATENT DOCUMENTS

| | | | | |
|---|---|---|---|---|
| 3,905,017 A * | 9/1975 | Samra | ..................... | B60Q 1/486 340/468 |
| 4,431,984 A * | 2/1984 | Bileck | ..................... | B60Q 1/503 200/61.27 |
| 4,864,754 A * | 9/1989 | Sangu | ..................... | B60Q 1/503 40/593 |
| 5,119,278 A | 6/1992 | Watson | | |
| 5,347,261 A * | 9/1994 | Adell | ..................... | B60Q 1/38 307/10.8 |
| 6,178,677 B1 * | 1/2001 | Williams | ............... | B60Q 1/503 340/902 |
| 6,268,793 B1 * | 7/2001 | Rossi | ..................... | B60Q 1/302 340/436 |
| 6,789,339 B2 | 9/2004 | Blease | | |
| 7,696,865 B1 * | 4/2010 | Robinson | ............... | B60Q 1/503 340/472 |
| 7,866,861 B2 | 1/2011 | Alexander | | |
| 2007/0030139 A1 * | 2/2007 | Ellison | .................... | B60Q 1/503 340/482 |
| 2011/0073773 A1 * | 3/2011 | Labrot | .................... | B32B 17/10 250/461.1 |
| 2011/0137521 A1 * | 6/2011 | Levi | ........................ | B60N 2/002 701/36 |
| 2013/0121010 A1 * | 5/2013 | McClendon | ............ | G09F 13/04 362/520 |
| 2013/0218679 A1 * | 8/2013 | Wu | ..................... | G06Q 30/0242 705/14.58 |
| 2014/0267014 A1 * | 9/2014 | Williams | ................... | G06F 3/02 345/156 |
| 2014/0338239 A1 * | 11/2014 | Scheiman | ................. | G09F 7/18 40/597 |

* cited by examiner

*Primary Examiner* — Nabil H Syed
*Assistant Examiner* — Cal J Eustaquio
(74) *Attorney, Agent, or Firm* — Neustel Law Offices

(57) ABSTRACT

A vehicle messaging system for efficiently messaging other vehicle drivers. The vehicle messaging system generally includes a transparent member attached to a surface of a window of a motorized vehicle, a message attached to the transparent member, a light unit attached to the motorized vehicle and a control unit in communication with the light unit and a turn signal controller of the motorized vehicle. The control unit is programmed to automatically activate the light unit after the turn signal controller transitions from having a turn signal activated to having a turn signal deactivated. The light unit illuminates the message when the light unit is activated so that the message is viewable by a person outside of the motorized vehicle.

13 Claims, 17 Drawing Sheets

VEHICLE MESSAGING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to signage for vehicles and more specifically it relates to a vehicle messaging system for efficiently messaging other vehicle drivers when they allow a person to pass them.

Description of the Related Art

Any discussion of the related art throughout the specification should in no way be considered as an admission that such related art is widely known or forms part of common general knowledge in the field.

Static signs on vehicles have been used for years. Conventional static signs on vehicles are comprised of bumper stickers and constantly illuminated signage attached to the vehicle. However, there is no system currently available that allows a driver of a vehicle to send a visual message to another driver after passing the other driver and then turn off after a period of time of being activated. Hence, while conventional static signs for vehicles are useful they do not provide the user with the opportunity to have them turned off when not needed.

Because of the inherent problems with the related art, there is a need for a new and improved vehicle messaging system for efficiently messaging other vehicle drivers.

BRIEF SUMMARY OF THE INVENTION

Provided herein is a vehicle messaging system which includes a transparent film attached to a surface of a window of a motorized vehicle, a message attached to the transparent film, a light unit attached to the motorized vehicle and a control unit in communication with the light unit and a turn signal controller of the motorized vehicle. The control unit is programmed to automatically activate the light unit after the turn signal controller transitions from having a turn signal activated to having a turn signal deactivated. The light unit illuminates the message when the light unit is activated so that the message is viewable by a person outside of the motorized vehicle.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the various embodiments of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
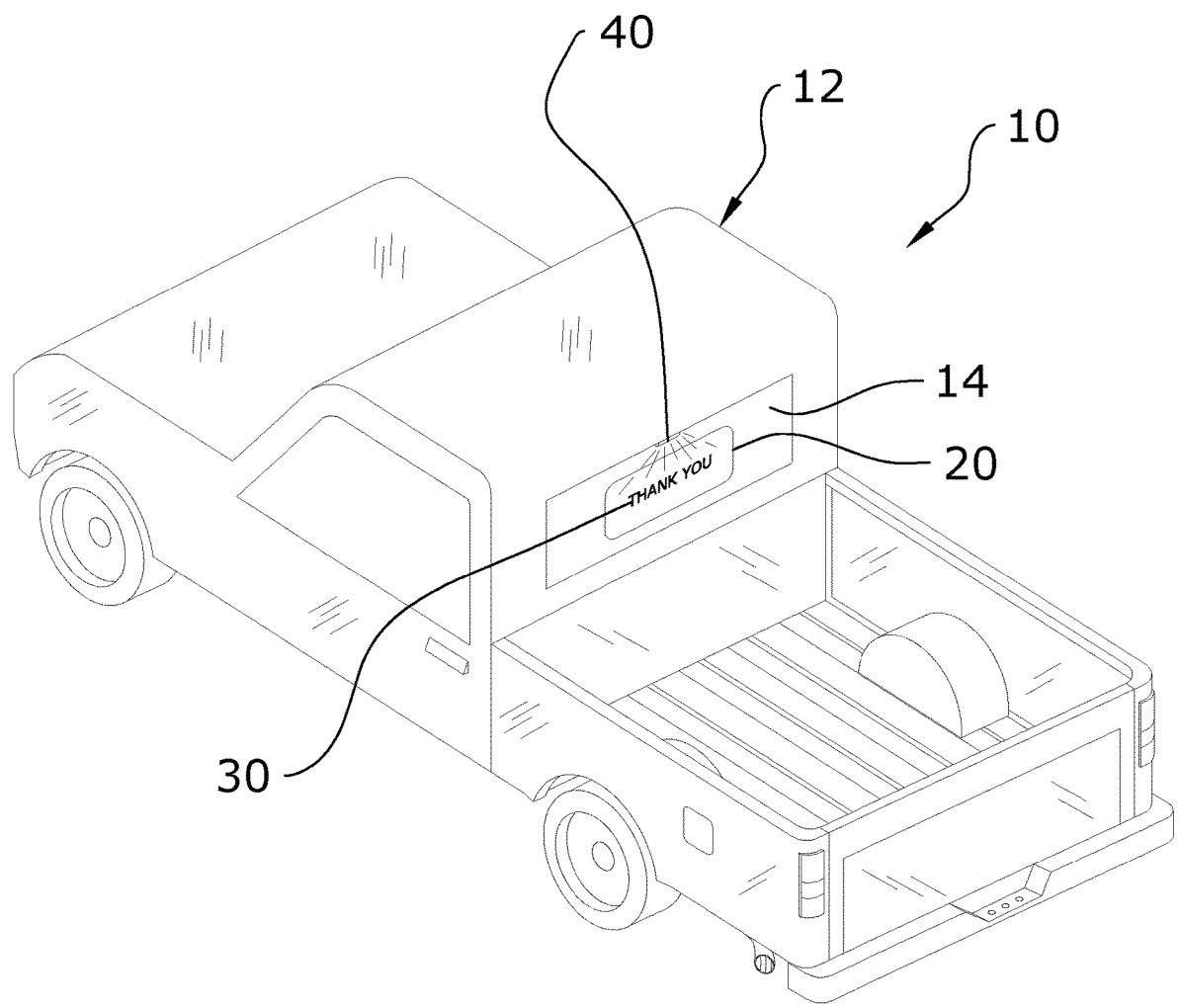
FIG. 1 is an upper perspective view of one embodiment of the present invention attached to the rear window of a motorized vehicle.
Figure 2:
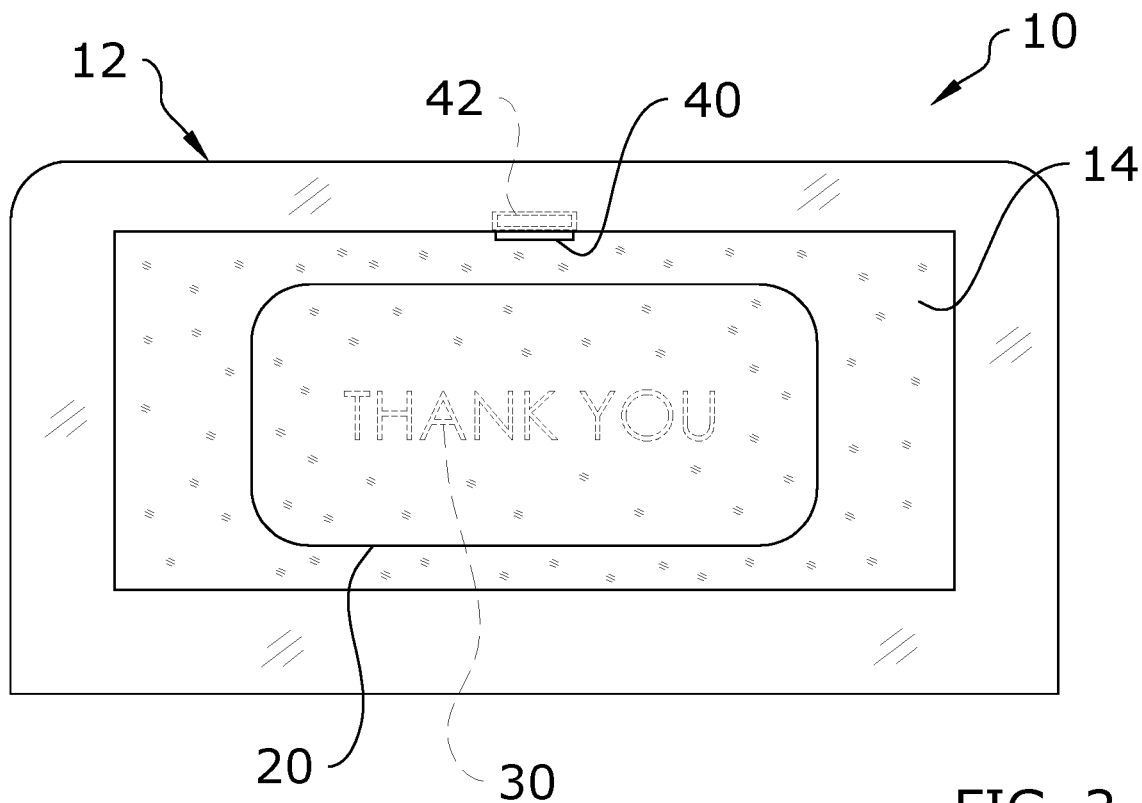
FIG. 2 is a front view of the present invention attached to a rear window of a vehicle with the message deactivated and not viewable to drivers behind the vehicle.
Figure 3:
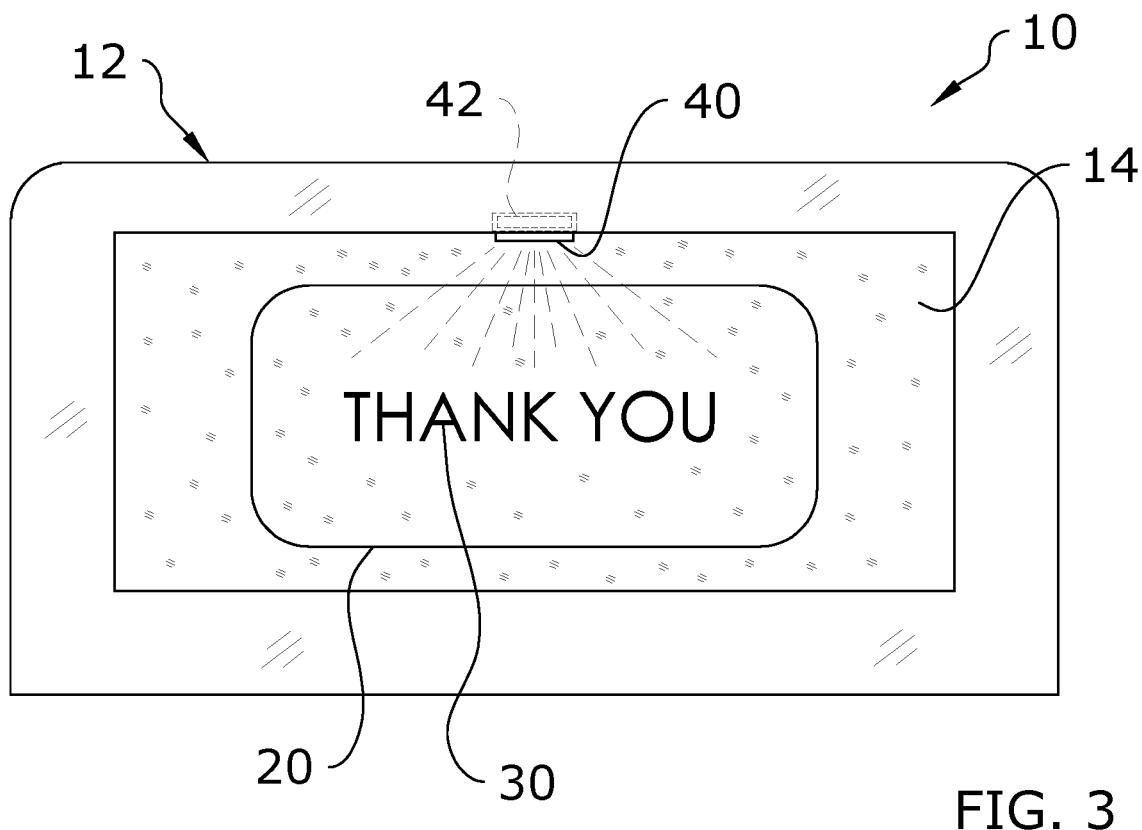
FIG. 3 is a front view of the present invention attached to a rear window of a vehicle and visually activated to display a message to drivers behind the vehicle.

Turning now descriptively to the drawings, in which similar reference characters denote similar elements throughout the several views, FIGS. 1 through 18 illustrate various embodiments of the vehicle messaging system 10, which comprises a transparent film 20 attached to a surface of a window of a motorized vehicle 12, a message 30 attached to the transparent film 20, a light unit 40 attached to the motorized vehicle 12 and a control unit 50 in communication with the light unit 40 and a turn signal controller 16 of the motorized vehicle 12. The control unit 50 is programmed to automatically activate the light unit 40 after the turn signal controller 16 transitions from having a turn signal activated to having a turn signal deactivated. The light unit 40 illuminates the message 30 when the light unit 40 is activated so that the message 30 is viewable by a person outside of the motorized vehicle 12.

The present invention may be utilized with various types of motorized vehicles 12 such as, but not limited, trucks, pickups, cars, motorcycles, scooters and the like. The transparent film 20 is preferably attached to the inside surface of the rear window 14 of the motorized vehicle 12, however, the transparent film 20 may be attached to the outside surface of the window and/or to a different window. The present invention provides the user the ability to visually send a message 30 to another driver showing gratitude that allows the user to pass them (e.g. a lane change, merging, entering traffic, leaving a parking spot or private property, etc.).

B. Transparent Film

Figure 4:
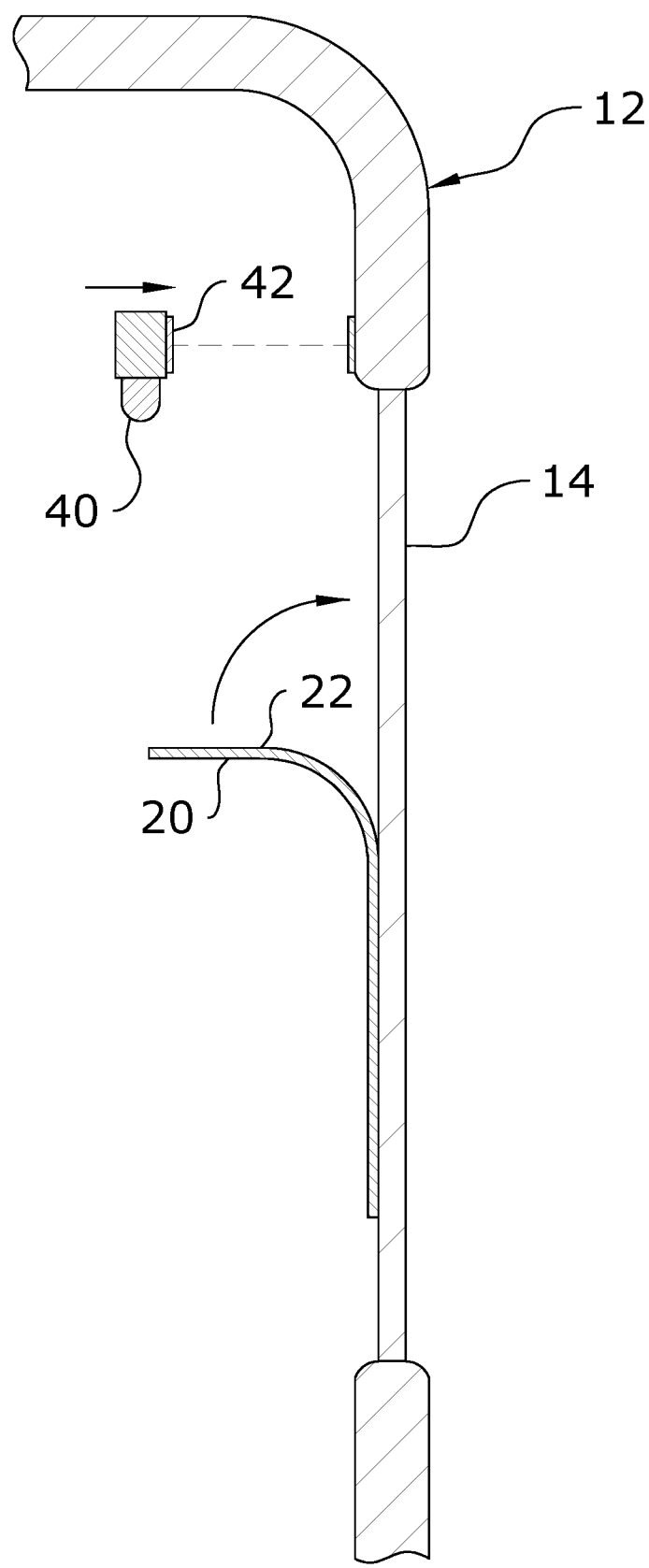
FIG. 4 is a side cutaway view of the present invention being attached to the inside surface of the rear window.
Figure 5:
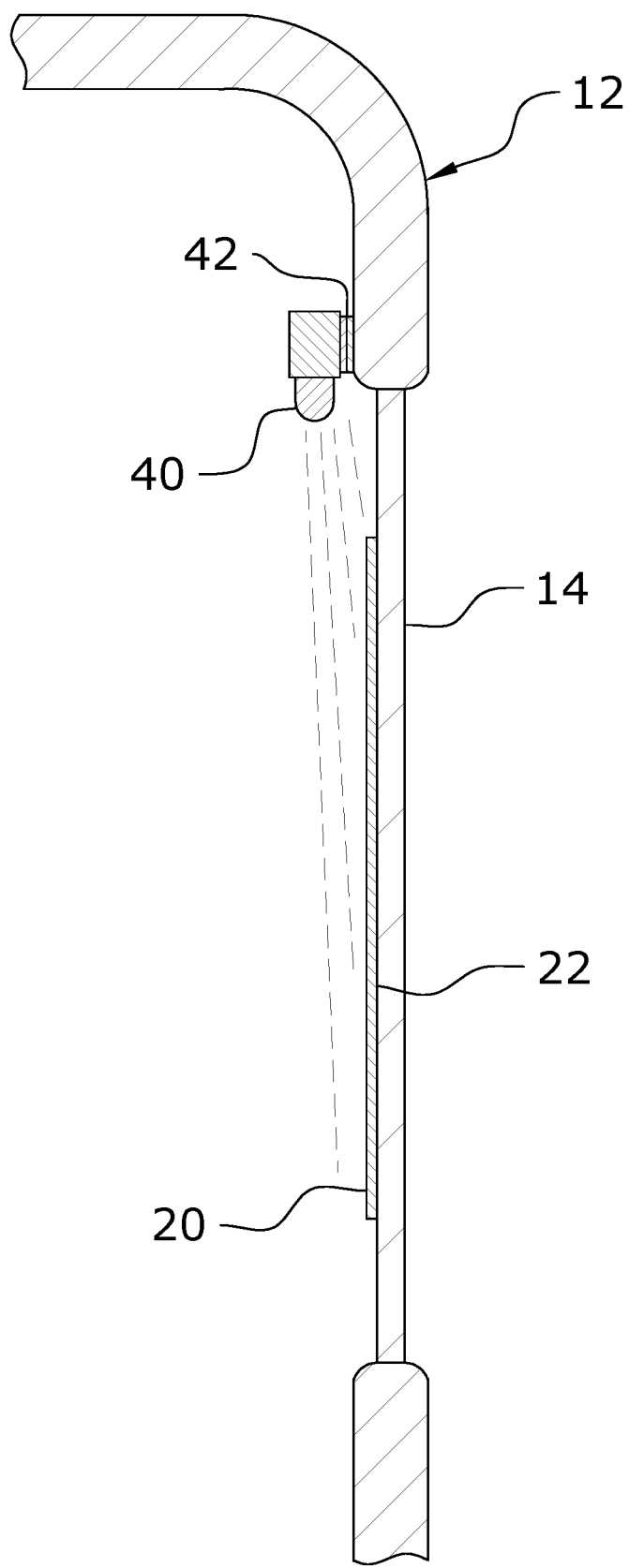
FIG. 5 is a side cutaway view with the present invention fully attached to the inside surface of the rear window and the light unit activated to illuminate the message on the transparent film.

The present invention utilizes a sheet of transparent film 20 that is attached to a surface of a window of a motorized vehicle 12. The transparent film 20 preferably includes an adhesive side 22 that adheres to the surface of the window as illustrated in FIGS. 4 and 5 of the drawings. The transparent film 20 is preferably comprised of a see-through self-adhesive reflective film that is almost invisible to the human eye until illuminated by the light.

C. Message

The message 30 showing gratitude to another drive is attached to the transparent film 20. The message 30 is preferably comprised of stenciled letters or illustration that show the desired message 30, however the message 30 may be attached to the transparent film 20 via other manners. The message 30 is illustrated as "THANK YOU" in FIGS. 1 through 3 of the drawings, but it can be appreciated that the message 30 may be comprised of various other words, phrases, letters, numbers, characters, logos and designs that are capable of being viewable by another driver behind the user's vehicle. The message 30 may be available in different languages for other countries.

D. Light Unit

The light unit 40 is attached to the motorized vehicle 12 and is further preferably attached to the interior of the motorized vehicle 12 using a connector 42 (e.g. screws, fasteners, clips, hook and loop fastener) as illustrated in FIG. 5 of the drawings. The light unit 40 is preferably attached above the transparent film 20 and illuminates downwardly upon the transparent film 20, however, the light unit 40 may be positioned in different locations with respect to the transparent film 20.

The light unit 40 may be comprised of an LED light, incandescent light or the like. The light unit 40 is capable of providing sufficient light to the transparent film 20 to illuminate the message 30 on the transparent film 20. The light unit 40 may be able to illuminate the message 30 and transparent film 20 in various colors as selected by the user via the control unit 50 and/or manual controller 60. The light unit 40 may be electrically powered by any type of power supply 18 such as batteries or by the electrical power system of the motorized vehicle 12.

The light unit 40 illuminates the message 30 on the transparent film 20 when the light unit 40 is activated thereby making the message 30 visible to other drivers. When the light unit 40 is deactivated, the light unit 40 does not illuminate the message 30 thereby making the message 30 invisible to other drivers. The message 30 is viewable by a person outside of the motorized vehicle 12 when the light unit 40 is activated and wherein the message 30 is not viewable by a person outside of the motorized vehicle 12 when the light unit 40 is deactivated.

E. Control Unit

Figure 6:
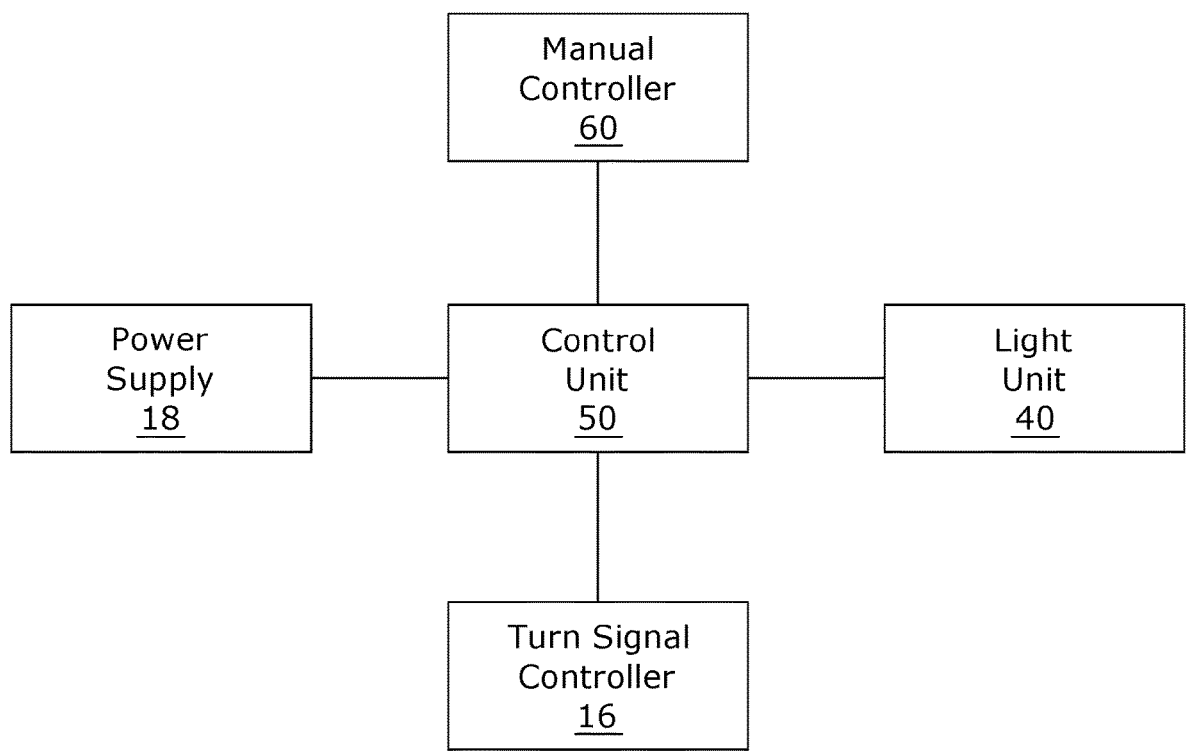
FIG. 6 is a block diagram of the present invention.
Figure 7:
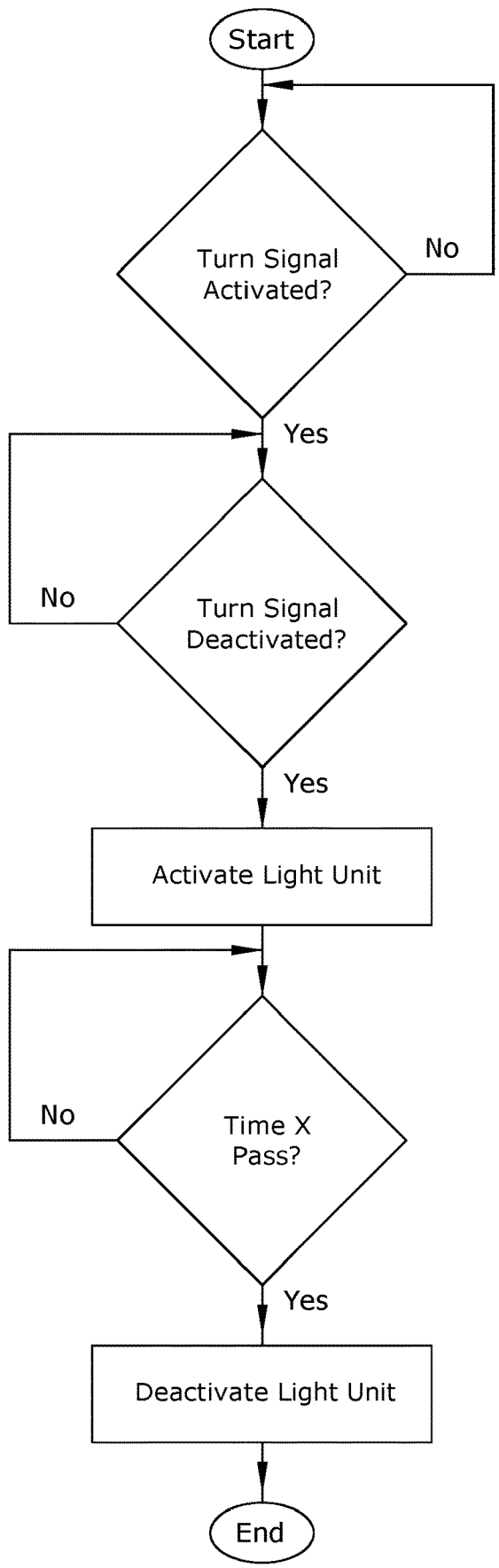
FIG. 7 is a flowchart illustrating the operation and functionality of the present invention.

As illustrated in FIG. 6, the control unit 50 is in communication with the light unit 40 and a turn signal controller 16 of the motorized vehicle 12. The control unit 50 is programmed to automatically activate the light unit 40 after the turn signal controller 16 transitions from having a turn signal activated to having a turn signal deactivated as illustrated in FIG. 7. The control unit 50 automatically deactivates the light unit 40 after a period of time passes (e.g. 3 seconds). The control unit 50 may be comprised of any electronic device capable of controlling the light unit 40 such as a computer. The control unit 50 is electrically powered by the power supply 18 of the motorized vehicle 12. The control unit 50 communicates with the light unit 40 either wirelessly or via a wired connection.

F. Manual Controller

In an alternative embodiment, a manual controller 60 is in communication with the control unit 50 to allow the user of the motorized vehicle 12 to manually activate or deactivate the light unit 40. The manual controller 60 is attached within the motorized vehicle 12 for the driver of the motorized vehicle 12 to manually activate or deactivate the light unit 40 as they desire without relying upon the automatic operation and control of the control unit 50 based upon the state of the turn signal controller 16 of the motorized vehicle 12. The manual controller 60 may be a manual switch (e.g. toggle switch) that is positioned within the interior of the motorized vehicle 12. The manual controller 60 may be used to override the automatic light control system and may also be used to control the color of light emitted by the light unit 40. The manual controller 60 and the control unit 50 may be a single device.

G. First Alternative Embodiment

FIGS. 8 through 16 illustrate the alternative embodiment of the present invention comprised of a rigid or semi-rigid transparent sheet 24 that includes a transparent frame 26 extending around at least a portion of the perimeter thereof. The transparent sheet 24 is preferably comprised of a rigid transparent plastic sheet having a rectangular shape. The transparent sheet 24 includes the message 30 printed on or etched into the rear surface of the transparent sheet. The light unit 40 is positioned in the lower portion of the transparent sheet 24 directing the light upwardly within the transparent sheet 24 thereby selectively illuminating the message 30 which is normally not visible to others until illuminated.

Figure 8:
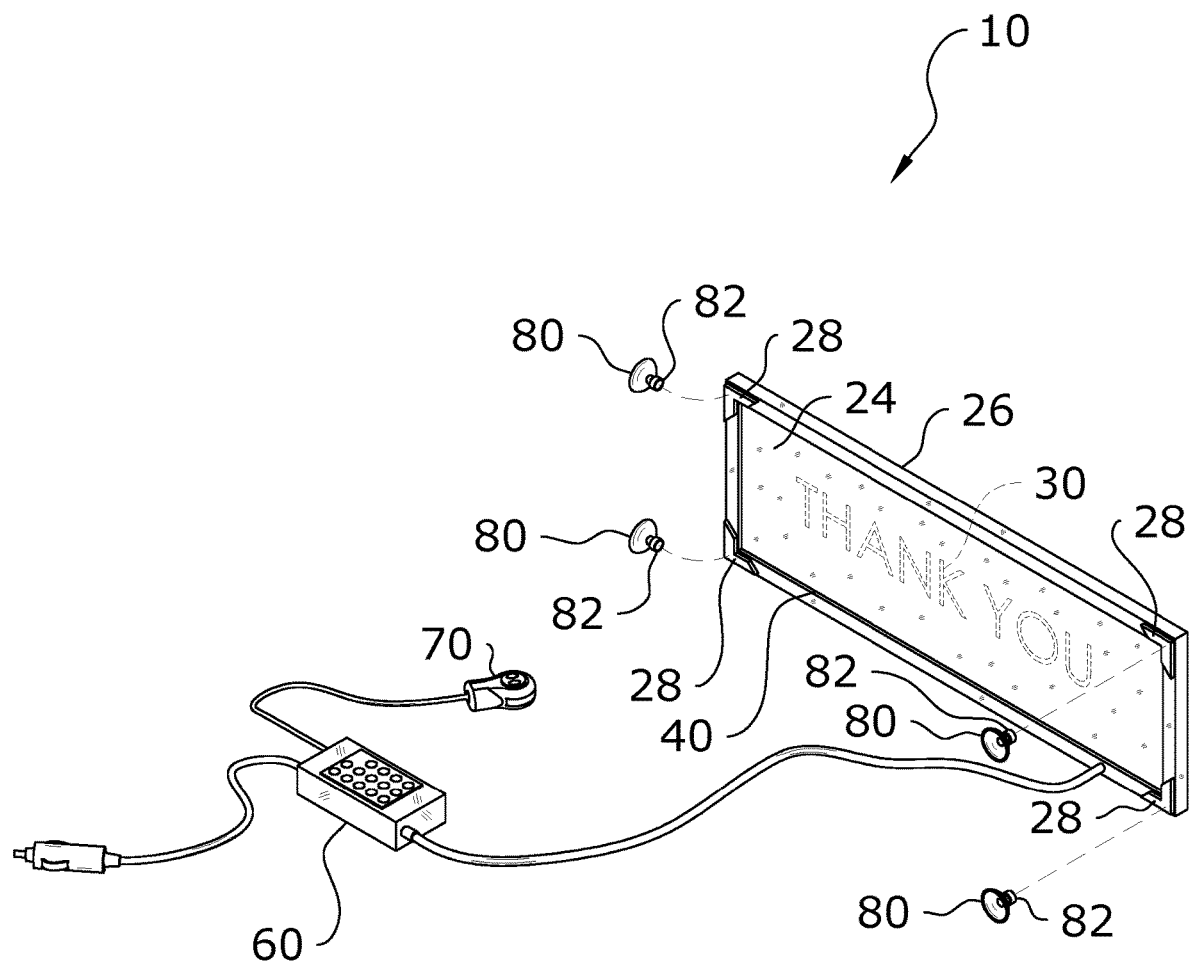
FIG. 8 is an exploded front upper perspective view of an alternative embodiment of the present invention.
Figure 9:
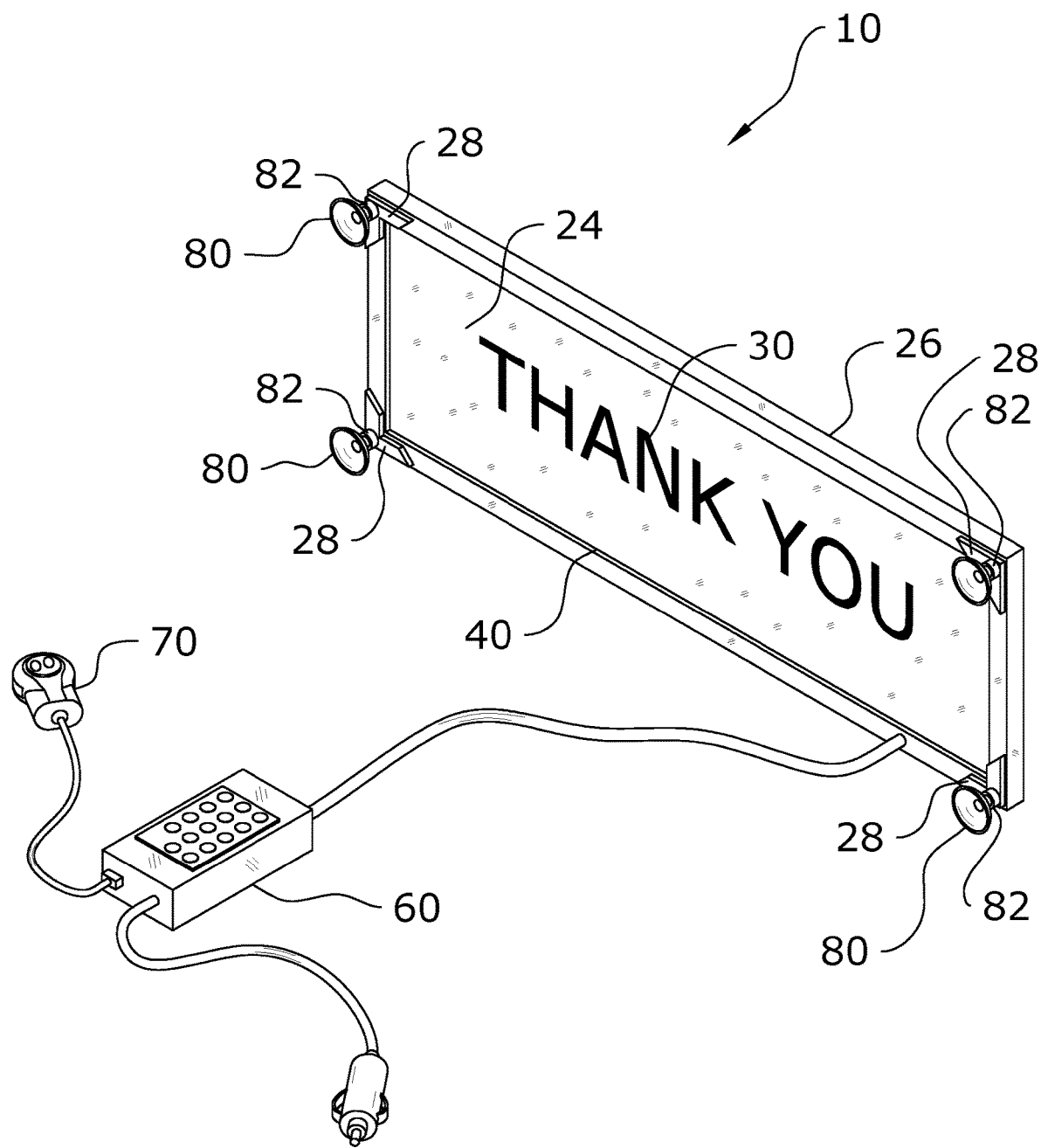
FIG. 9 is a front upper perspective view of the alternative embodiment of the present invention.
Figure 10:
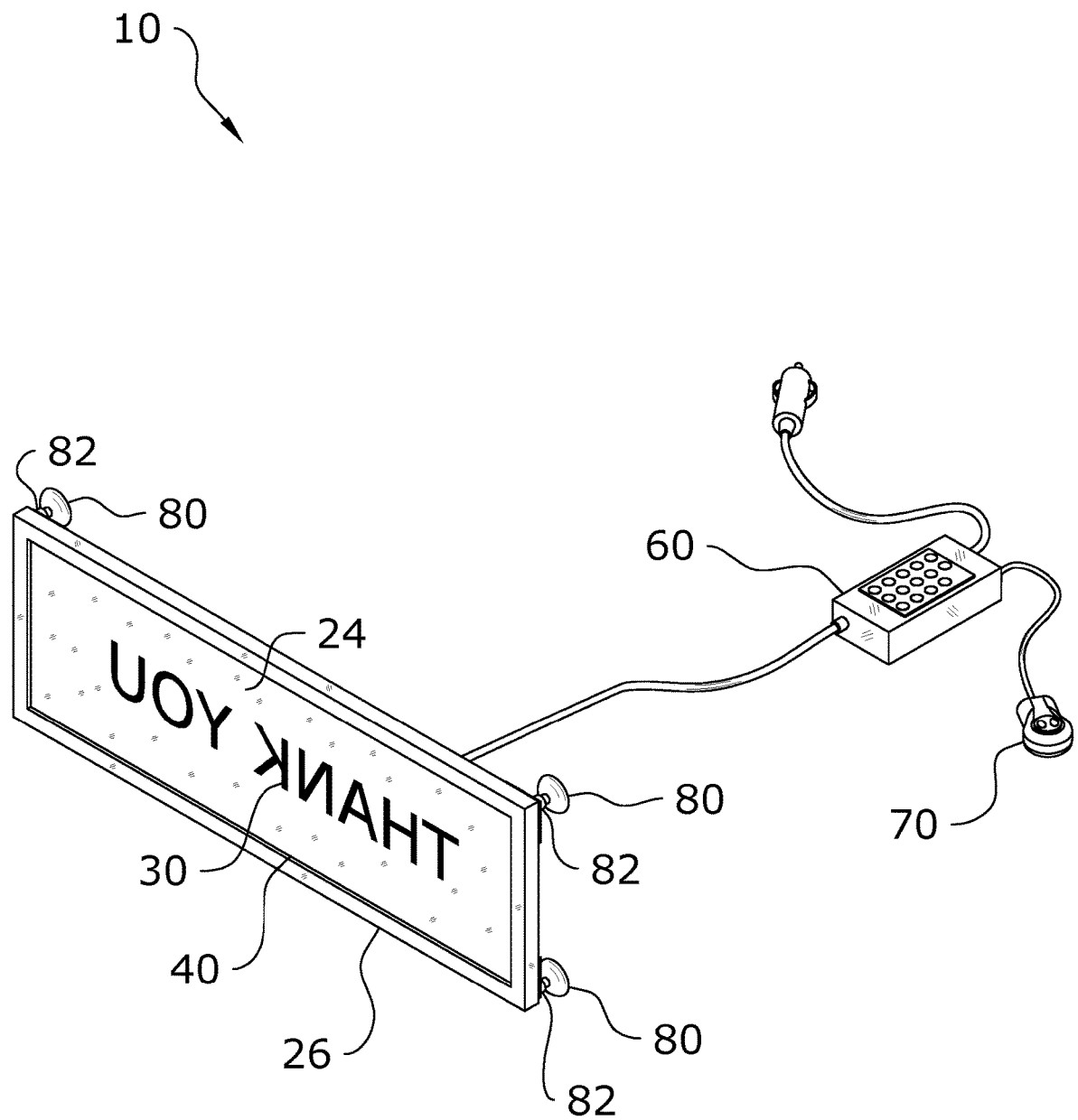
FIG. 10 is a rear upper perspective view of the alternative embodiment.
Figure 11:
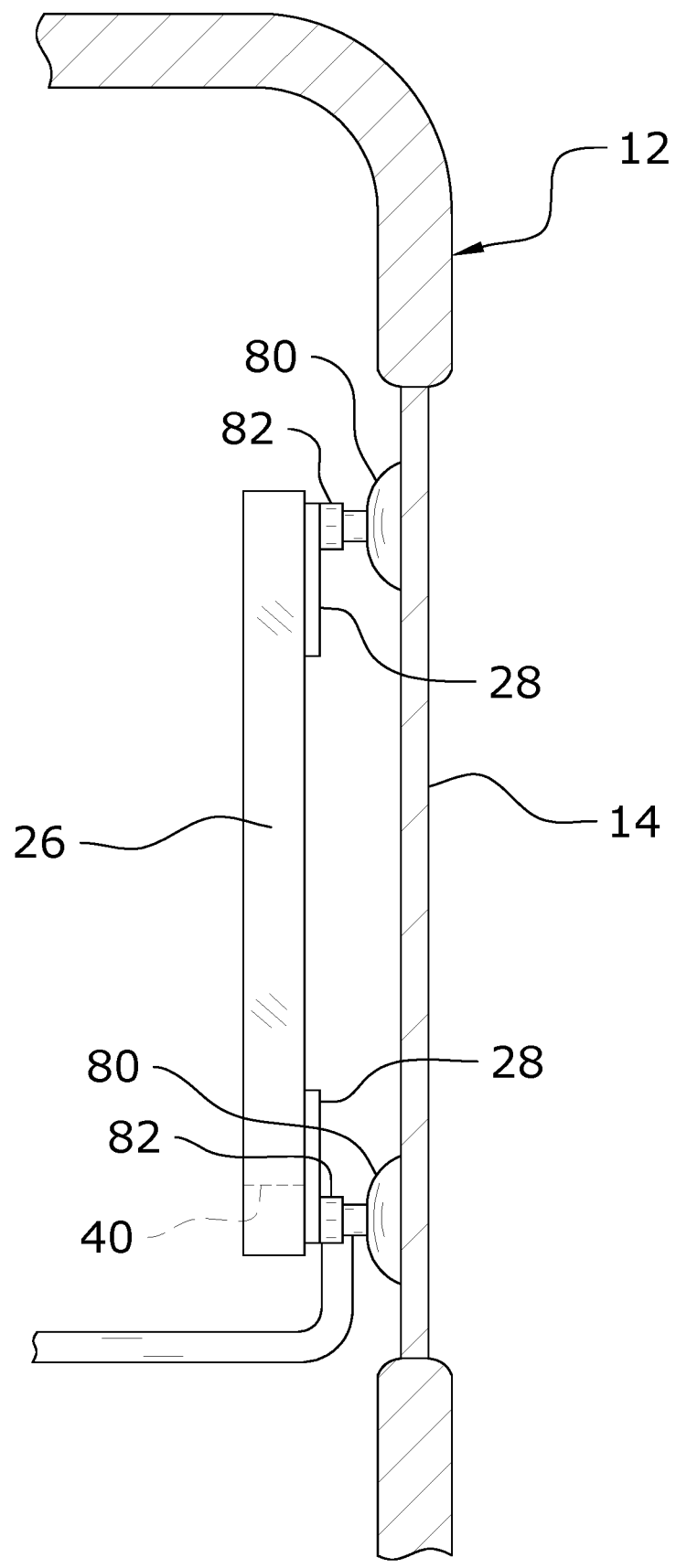
FIG. 11 is a side view of the alternative embodiment attached to a rear window of a motorized vehicle.

A plurality of metal members 28 are attached to the transparent frame 26 as best illustrated in FIG. 8 of the drawings. The metal members 28 are preferably L-shaped and are positioned in the corners of the rear portion of the transparent frame 26. A plurality of suction cups 80 with magnets 82 are removably connected to the metal members 28. The magnets 82 are magnetically attracted to the metal members 28. Alternatively, the frame for the transparent sheet 24 may be constructed of a non-transparent metal material without using the metal members 28. The suction cups 80 are attached to the interior surface of the rear window 14 and the transparent sheet 24 may be easily removed from the magnets to allow for cleaning of the rear window 14 without having to remove the suction cups 80.

Figure 12:
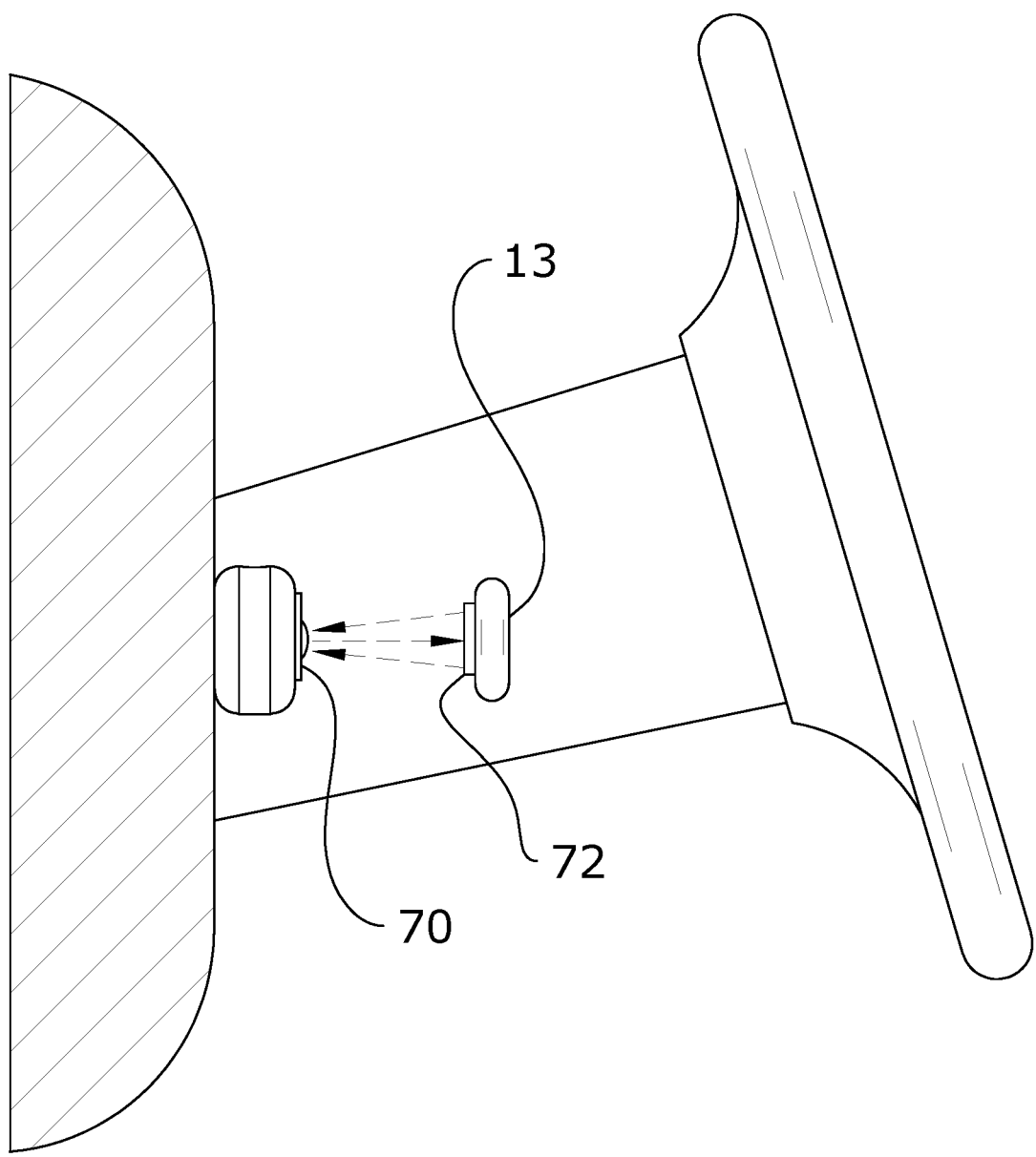
FIG. 12 is a side view of the turn signal detector detecting the normal position of the turn signal lever.
Figure 13:
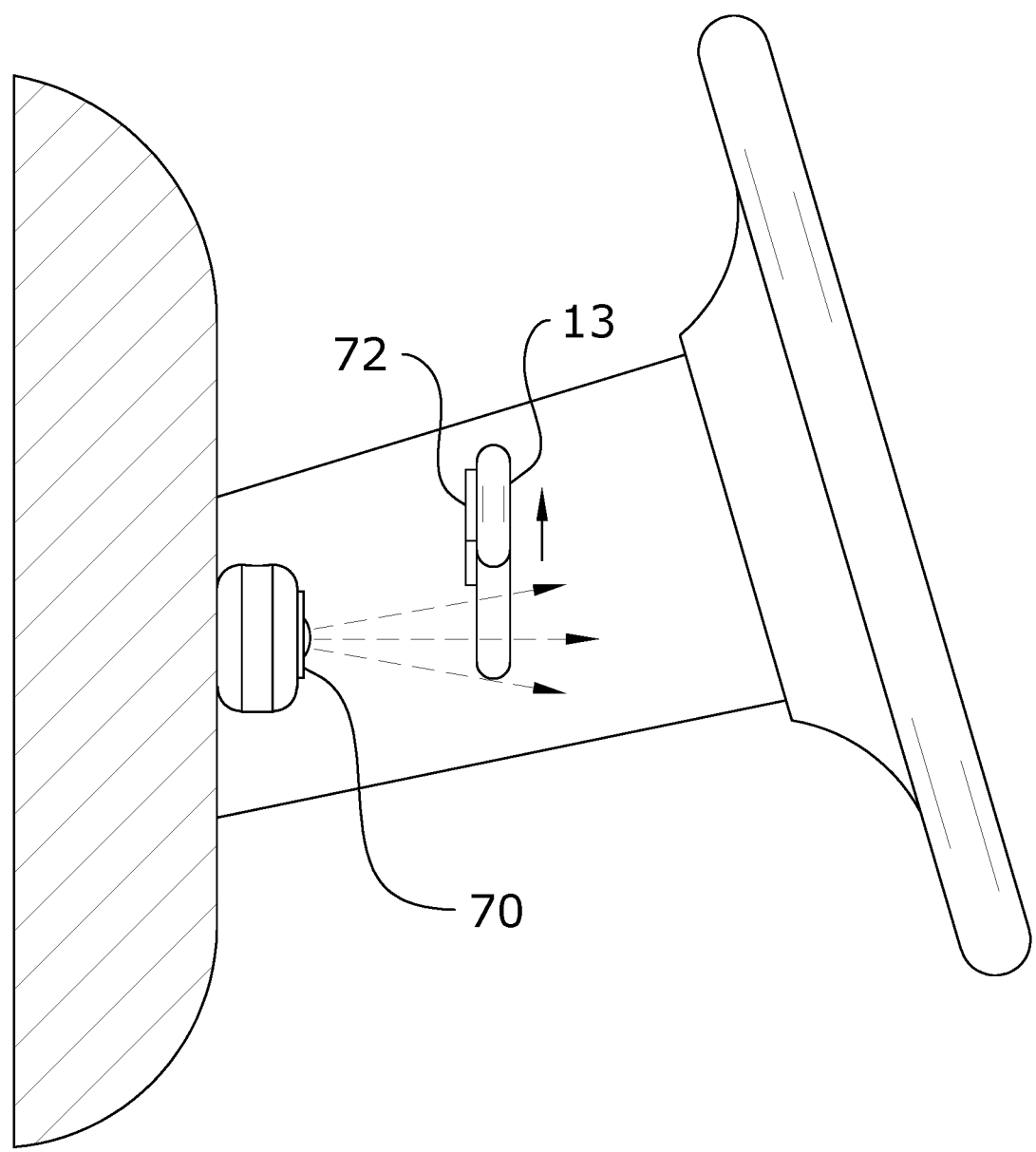
FIG. 13 is a side view of the turn signal detector detecting the activated position of the turn signal lever.
Figure 14:
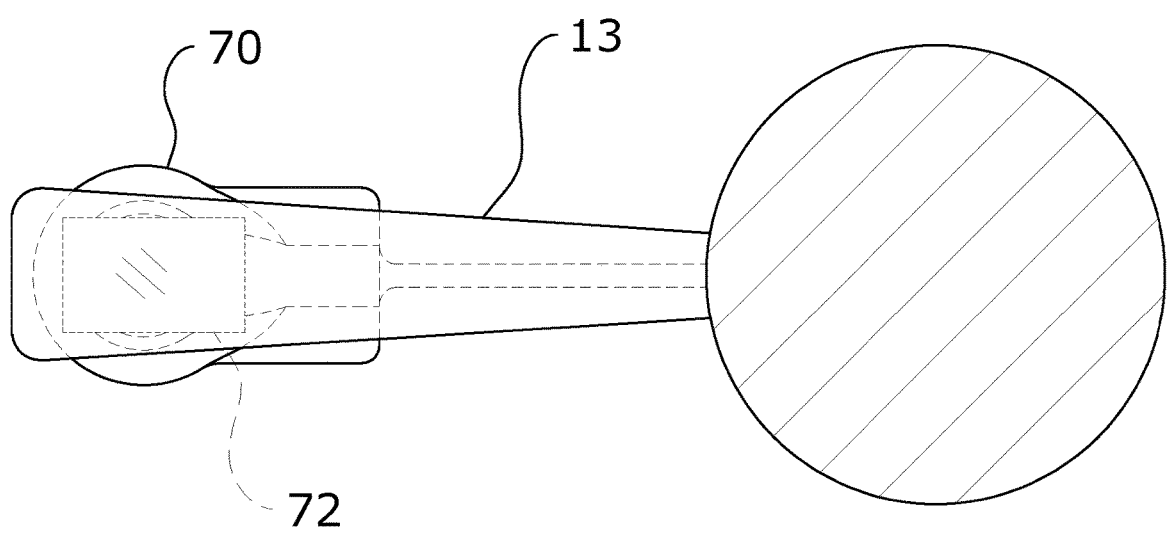
FIG. 14 is a front view of the turn signal detector detecting the normal position of the turn signal lever.
Figure 15:
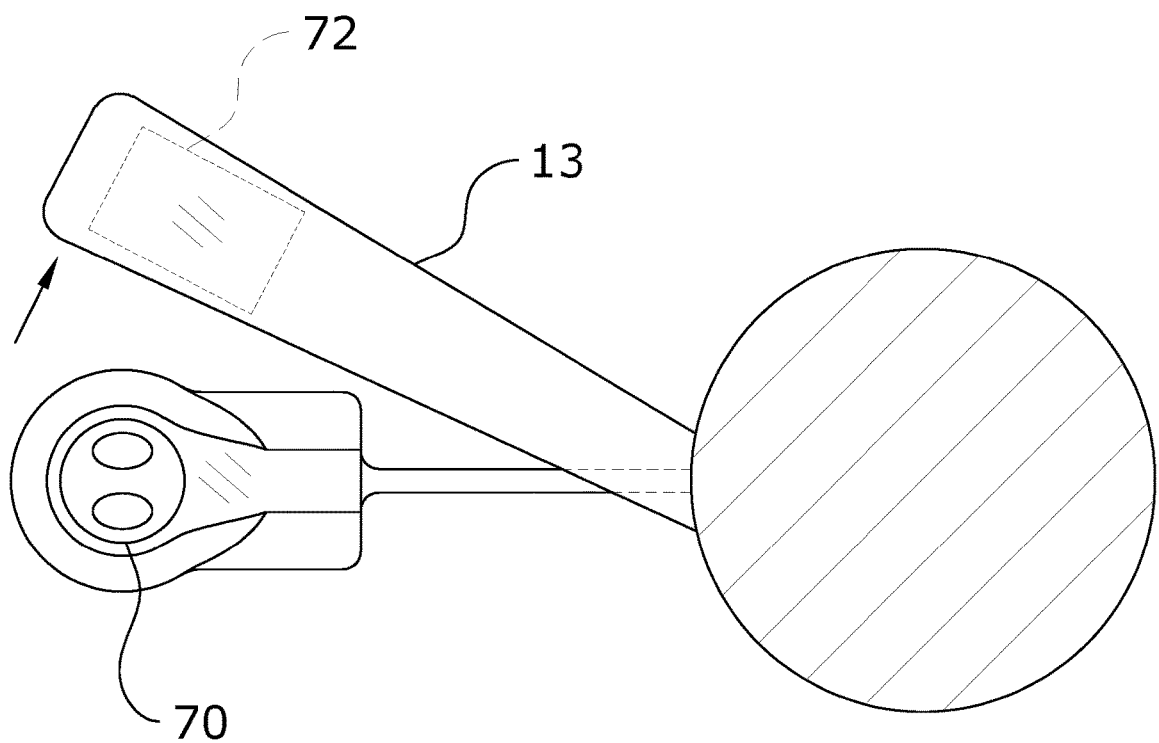
FIG. 15 is a front view of the turn signal detector detecting the activated position of the turn signal lever.
Figure 16:
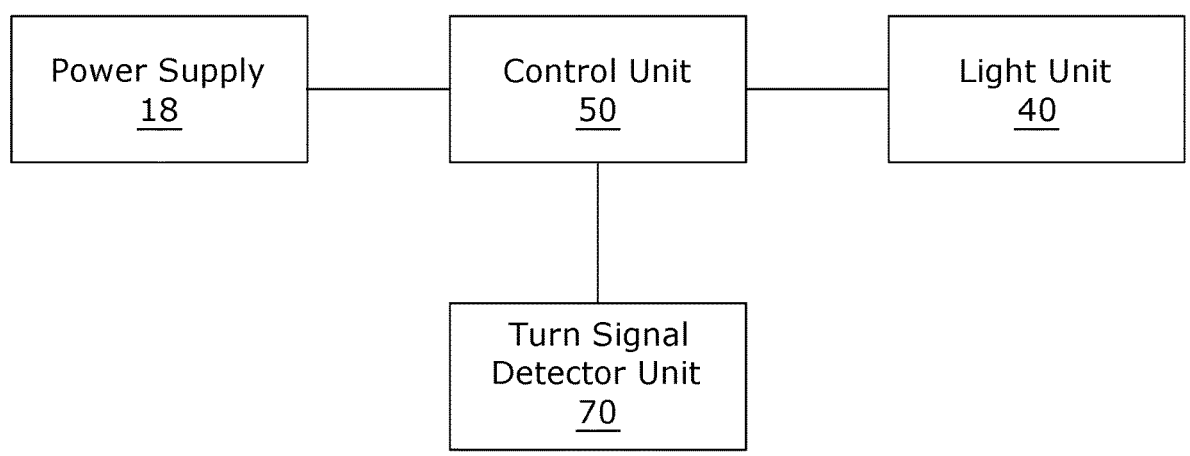
FIG. 16 is a block diagram illustrating the communications between the devices of the alternative embodiment.

A turn signal detector unit 70 is attached to the dashboard of the vehicle and is directed towards the turn signal lever 13 which has piece of reflector 72 (e.g. reflector tape) attached to the inner surface of the turn signal lever 13 as shown in FIGS. 12 through 15 of the drawings. The turn signal detector unit 70 is aligned such that when the turn signal lever 13 is in a normal non-operated state (i.e. no turn signal is activated), the reflector 72 reflects light (e.g. UV, infrared) emitted by a light transmitter of the turn signal detector unit 70 directly back to the turn signal detector unit 70 which is detected by a light receiver/detector within the turn signal detector unit 70 as shown in FIGS. 12 and 14. When the turn signal lever 13 is pivoted upwardly or downwardly, the reflector 72 is no longer aligned with the light transmitter of the turn signal detector unit 70 and the emitted light from the turn signal detector unit 70 is not reflected back to the turn signal detector unit 70 as illustrated in FIGS. 13 and 15. The turn signal detector unit 70 determines the state of the turn signal lever 13 based on whether light is detected by the turn signal detector unit 70 (i.e. if light is detected, the turn signal lever 13 is back in the normal centered position; if light is not detected, the turn signal lever 13 is moved to an activated non-centered position such as up or down indicating that the turn signal has been activated. To manually operate the turn signal detector unit 70, the driver of the vehicle can position their hand or other object between the turn signal detector unit 70 and the reflector 72 thereby imitating that the turn signal lever 13 has been moved up or down. The turn signal detector unit 70 communicates to the control unit 50 the detected position/state of the turn signal lever 13 based on the detection of the light emitted by the turn signal detector unit 70 and reflected back to the turn signal detector unit 70 by the reflector 72.

I. Second Alternative Embodiment

Figure 17:
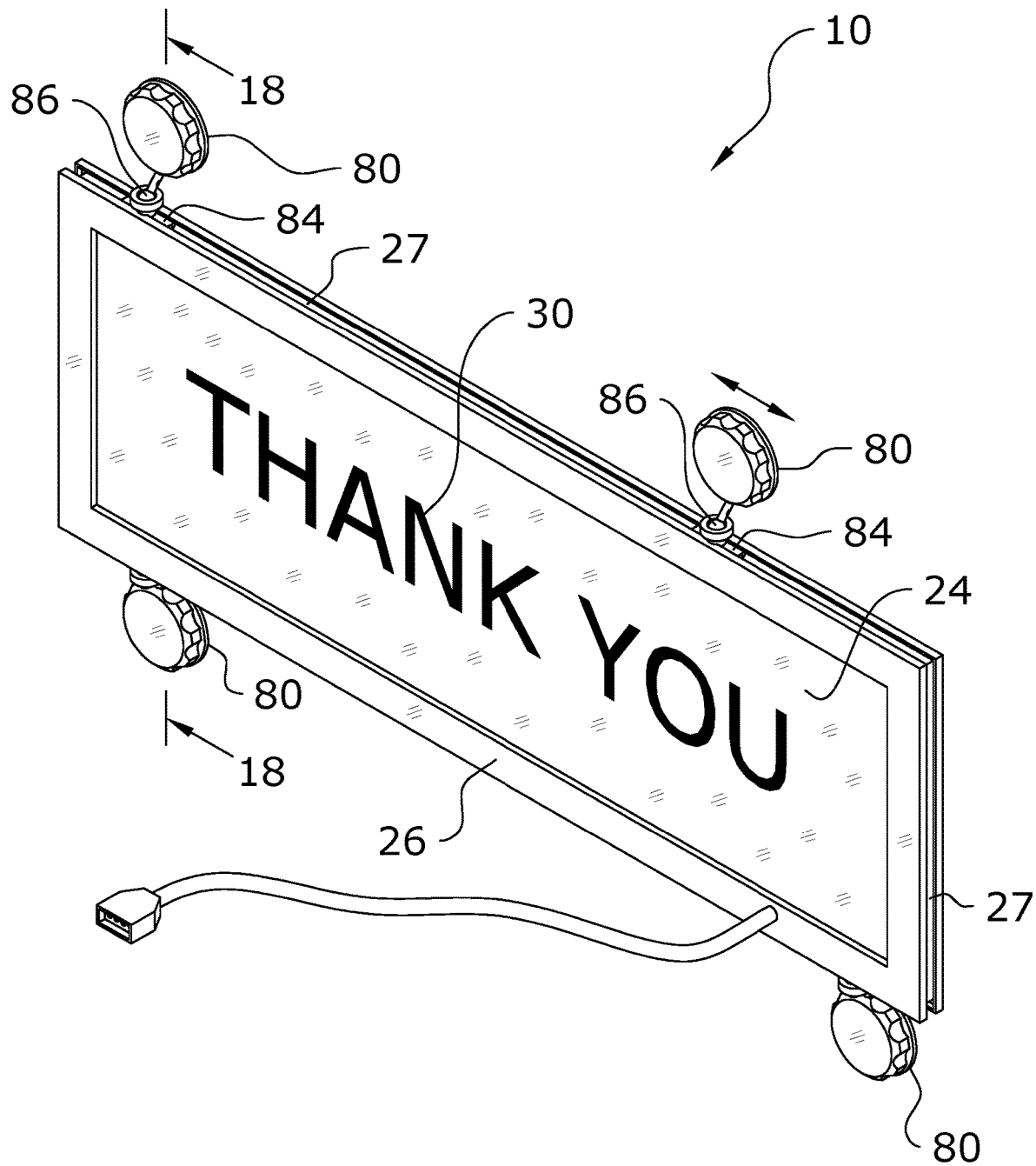
FIG. 17 is an upper perspective view of an alternative embodiment of the present invention.
Figure 18:
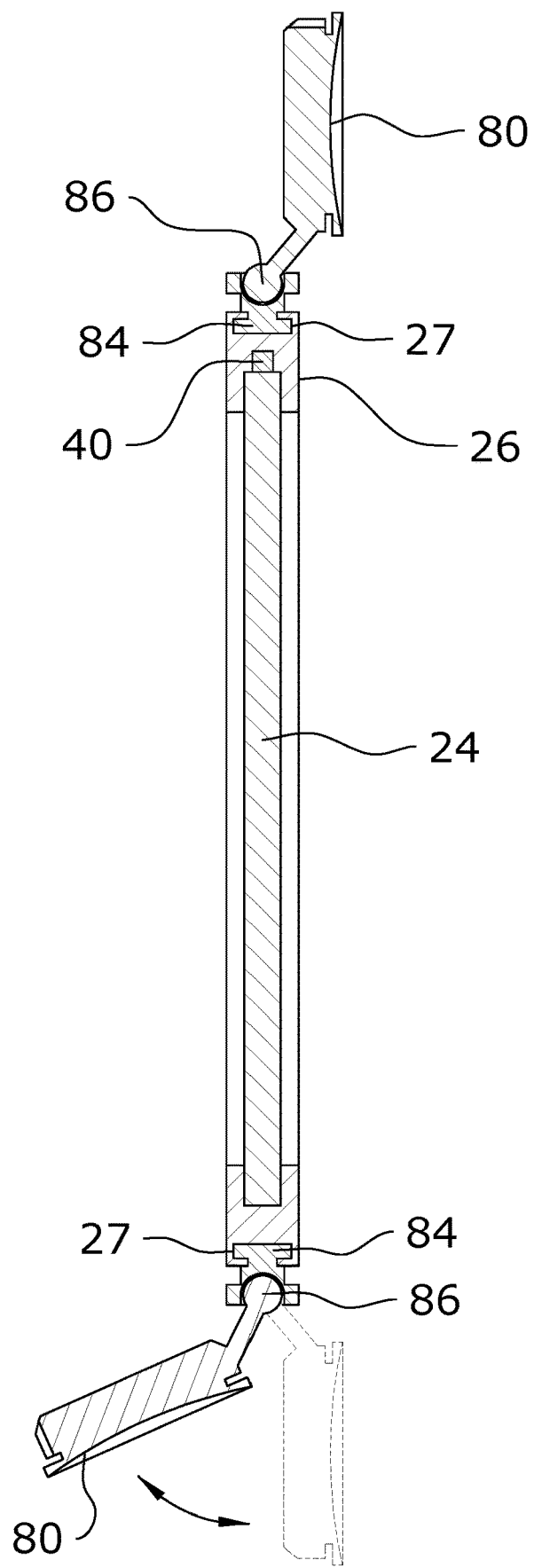
FIG. 18 is a cross sectional view taken along line 18-18 of FIG. 17.

FIGS. 17 and 18 illustrate another alternative embodiment of the present invention having a transparent member 24 and a message 30 attached to the transparent member 24. A frame 26 surrounds at least a portion of the transparent member 24. The frame 26 preferably surrounds the entire portion of the transparent member 24. The frame 26 extends around an entire perimeter of the transparent member 24 and the channel 27 preferably extends along a substantial portion of the frame 26. As illustrated in FIG. 18 of the drawings, the light unit 40 may be positioned within the frame 26 (e.g. an LED light strip that extends along a substantial length of the upper edge of the transparent member 24.

The transparent member 24 is preferably comprised of an elongated rectangular shape but may be comprised of various other shapes (e.g. oblong, square, circular, triangular). The frame 26 may be comprised of a transparent material or opaque material.

The frame 26 includes at least one channel 27. The channel 27 extends along an upper portion of the frame 26. The channel 27 also may extend along the side portions and the bottom portion of the frame 26 as illustrated in FIGS. 17 and 18.

A plurality of base members 84 are movably connected within the channel 27. The base members are preferably slidably positioned within the channel 27 to allow for adjustment of the position of the base members with respect to the frame but may be non-movably positioned also with in the channel 27.

A plurality of suction cups 80 are connected to the plurality of base members 84. The suction cups 80 are adapted to removably connect to a surface of a window 14 in a motorized vehicle 12. The suction cups 80 may be comprised of any type of suction cup such as, but not limited to, lever actuated suction cups, locking lever suction cups, flat design suction cups, mechanically activated suction cups and the like. A swivel joint 86 or other type of pivoting hinge is preferably connected between each of the suction cups 80 and the base members 84 to allow for adjustment of the suction cups 80 to different angles to accommodate various angles of windows 14.

The channel 27 is preferably comprised of a substantially T-shaped channel 27 as illustrated in FIG. 18. The lower portion of each of the base members 84 is comprised of a substantially T-shaped structure that slidably fits within the channel 27 as illustrated in FIG. 18. Various other shapes may be used for the channel 27 and the base members 84.

I. Operation of Invention

In use, the transparent film 20 with the message 30 is attached to the inside surface of the rear window 14 of the motorized vehicle 12 as illustrated in FIGS. 1 through 5 of the drawings. The light unit 40 is attached with the connector 42 to the interior of the motorized vehicle 12 and is directed to illuminate the transparent film 20 and message 30 when activated as illustrated in FIG. 5 of the drawings. The control unit 50 is connected to the turn signal controller 16 of the motorized vehicle 12 so the control unit 50 receives data regarding the state of the turn signal controller 16 (e.g. left turn signal on or off, right turn signal on or off). The alternative embodiment illustrates an aftermarket attachment using the turn signal detector unit 70 as discussed above which does not require any direct connection to the turn signal controller 16 of the vehicle 12.

The light unit 40 is initially in a deactivated state and not illuminating the message 30. The control unit 50 detects the state of the turn signal controller 16 or the turn signal lever 13 of the motorized vehicle 12 and automatically determines if the light unit 40 should be activated or deactivated. As shown in FIG. 7 of the drawings, the control unit 50 monitors for a transition of the turn signal controller 16 (or the turn signal lever 13) from an active state to an inactive state (for either the right turn signal light or the left turn signal light). After the control unit 50 determines that the turn signal controller 16 or the turn signal lever 13 of the motorized vehicle 12 has transitioned from the activated state (e.g. signaling left in a down position for the lever 13 or signaling right in the up position for the lever 13) to the deactivated state (e.g. the lever 13 is centered therefore no turn signal is activated), the control unit 50 then automatically activates the light unit 40 to illuminate the transparent film 20 (or the transparent sheet 24) and the corresponding message 30 so that the message 30 is visible to the driver behind the motorized vehicle 12. The control unit 50 retains the light unit 40 in an activate state for a period of time (e.g. 3 seconds) and then automatically deactivates the light unit 40 so the message 30 is no longer visible to the driver behind the motorized vehicle 12. The user may also manually activate or deactivate the light unit 40 at any time via the manual controller 60 or by positioning their hand between the turn signal detector unit 70 and the reflector 72.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A vehicle messaging system, comprising:
    a transparent member attached to a surface of a window of a motorized vehicle;
    a message attached to the transparent member;
    a light unit spaced apart from the message such that the light unit does not obscure a line of sight through the transparent member, wherein the light unit illuminates the message when the light unit is activated and wherein the light unit does not illuminate the message when the light unit is deactivated, wherein the message is viewable by a person outside of the motorized vehicle when the light unit is activated and wherein the message is not viewable by a person outside of the motorized vehicle when the light unit is deactivated; and
    a control unit in communication with the light unit, wherein the control unit determines a state of a turn signal controller of the motorized vehicle, wherein the control unit is programmed to automatically activate the light unit after the turn signal controller transitions from having a turn signal activated to having a turn signal deactivated.

2. The vehicle messaging system of claim 1, wherein the window is comprised of a rear window of the motorized vehicle.

3. The vehicle messaging system of claim 1, wherein the surface is comprised of an inside surface.

4. The vehicle messaging system of claim 1, wherein the message is comprised of stenciled letters.

5. The vehicle messaging system of claim 1, wherein the transparent member is comprised of a transparent film that includes an adhesive side that adheres to the surface of the window.

6. The vehicle messaging system of claim 1, wherein the transparent member is comprised of a transparent sheet having a plurality of suction cups attached thereto that removably connected to the surface of the window.

7. The vehicle messaging system of claim 1, wherein the control unit automatically deactivates the light unit after a period of time passes.

8. The vehicle messaging system of claim 1, including a turn signal detector unit in communication with the control unit, wherein the turn signal detector unit detects a state of a turn signal lever of the motorized vehicle and communicates the state of the turn signal lever to the control unit, and wherein the control unit determines the state of the turn signal controller of the motorized vehicle based on the state of the turn signal lever.

9. The vehicle messaging system of claim 8, wherein the control unit determines that the turn signal controller is in a deactivated state when the turn signal lever is centered and wherein the control unit determines that the turn signal controller is in an activated state when the turn signal lever is not centered.

10. A vehicle messaging system, comprising:
    a transparent member;
    a message attached to the transparent member;
    a frame surrounding at least a portion of the transparent member, the frame including a channel;
    a plurality of base members movably connected within the channel;
    a plurality of suction cups connected to the plurality of base members, wherein the plurality of suction cups are adapted to removably connect to a surface of a window in a motorized vehicle;
    a light unit spaced apart from the message such that the light unit does not obscure a line of sight through the transparent member, wherein the light unit illuminates the message when the light unit is activated and wherein the light unit does not illuminate the message when the light unit is deactivated, wherein the message is viewable by a person outside of the motorized vehicle when the light unit is activated and wherein the message is not viewable by a person outside of the motorized vehicle when the light unit is deactivated; and
    a control unit in communication with the light unit, wherein the control unit determines a state of a turn signal controller of the motorized vehicle, wherein the control unit is programmed to automatically activate the light unit after the turn signal controller transitions from having a turn signal activated to having a turn signal deactivated.

11. The vehicle messaging system of claim 10, wherein the channel is comprised of a substantially T-shaped channel and wherein a lower portion of each of the base members is comprised of a substantially T-shaped structure that slidably fits within the channel.

12. The vehicle messaging system of claim 10, including a swivel joint connected between each of the plurality of suction cups and the base members.

13. The vehicle messaging system of claim 10, wherein the frame extends around an entire perimeter of the transparent member and wherein the channel extends along a substantial portion of the frame.

* * * * *